United States Patent [19]

Bounds

[11] Patent Number: 4,709,865

[45] Date of Patent: Dec. 1, 1987

[54] DUAL CONDIMENT MILL

[76] Inventor: William E. Bounds, 3737 W. 240th St., Torrance, Calif. 90505

[21] Appl. No.: 454,736

[22] Filed: Dec. 30, 1982

[51] Int. Cl.⁴ .............................................. B02C 25/00
[52] U.S. Cl. ................................... 241/169.1; 74/353; 74/384; 241/138; 241/146
[58] Field of Search ...................... 241/169.1, 168, 138, 241/146, 63, 135, 169, 139, 141, 147; 222/142.3, 142.6, 142.7, 142.8, 142.9; 74/384, 354, 353

[56] References Cited

U.S. PATENT DOCUMENTS

| | | | |
|---|---|---|---|
| 95,135 | 9/1869 | Petrie | 241/146 X |
| 265,819 | 12/1882 | Johnston | 241/146 X |
| 1,692,162 | 11/1928 | Exsternbrink | 241/146 |

FOREIGN PATENT DOCUMENTS

| | | | |
|---|---|---|---|
| 2222865 | 11/1973 | Fed. Rep. of Germany | 241/169.1 |
| 749911 | 8/1933 | France | 241/146 |
| 1325666 | 3/1963 | France | 74/384 |

Primary Examiner—Howard N. Goldberg
Assistant Examiner—Joseph M. Gorski
Attorney, Agent, or Firm—Edward A. Sokolski

[57] ABSTRACT

A condiment mill has a pair of separate compartments each for containing a different condiment, such as peppercorns and salt crystals. At the bottom of each compartment, a grinder is installed for grinding the condiment. A shaft is provided for rotatably driving each of the grinders, each such shaft extending upwardly through its associated compartment and having a spur gear fixedly attached to the upper end thereof. A pivotally supported gear drive mechanism is provided at the top of the compartments which engages the gear of one of the grinders when rotated in one direction and the gear of the other of the grinders when rotated in an opposite direction to enable the alternative grinding and dispensing of one or the other of the condiments. A cover is provided for the top of the compartments, this cover being spring-urged into its closed position over the compartments. This cover can be manually raised against the spring action and rotated to permit the filling of the compartment with condiment.

7 Claims, 8 Drawing Figures

DUAL CONDIMENT MILL

This invention relates to a dual condiment mill and more particularly to such a mill having separate compartments for two different condiments along with separate grinders for each of the condiments which can be manually actuated by means of a single handle.

Among discriminating diners there is a demand for not only a grinder for grinding pepper but also other condiments such as rock salt. A separate grinder is generally employed for each one of these condiments. The additional mills required for this purpose uses up additional space on the table and adds an additional unit to handle. The device of the present invention obviates the need for separate grinders for both salt and pepper or other combinations of condiment by incorporating a pair of condiment mills into a single unit capable of storing, grinding and dispensing each of the condiments separately.

Briefly described, the device of the invention comprises a container having two separate compartments, one for containing each condiment. A separate grinder is provided at the bottom of each such compartment, the grinders being rotatably driven by a shaft which runs upwardly through the associated compartment. A spur gear is fixedly attached to the upper end of each of such shafts. A gear drive mechanism is provided, this gear drive mechanism being pivotally mounted between the two spur gears. A handle is provided for rotatably driving the pivotally supported drive gear mechanism. When this handle is turned in one direction, the gear drive mechanism drives one of the spur gears to grind and dispense one of the condiments and when the handle is turned in an opposite direction, the other spur gear is rotatably driven to grind and dispense the other of the condiments. A single spring actuated cover is provided for closing the tops of both compartments, this cover being capable of being manually raised and rotated against the spring action to permit the filling of each of the compartments with condiment.

It is therefore an object of this invention to incorporate a pair of condiment mills into a single unit.

It is a further object of this invention to provide a compact and economical condiment mill for storing, grinding and dispensing different condiments.

Other objects of this invention will become apparent as the description proceeds in connection with the accompanying drawings of which FIG. 1 is a top plan view of a preferred embodiment of the invention FIG. 2 is a side elevational view of the preferred embodiment FIG. 3 is a bottom plan view of the preferred embodiment FIG. 4 is a top plan view of the preferred embodiment shown with the cover in a position for filling the compartments with condiment FIG. 5 is a cross sectional view taken along the plane indicated by 5—5 in FIG. 2

Figure 1:
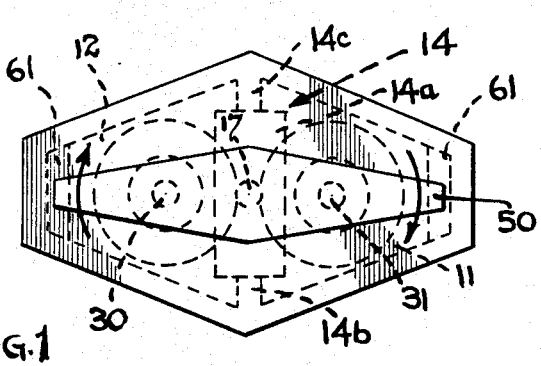

Referring now to the drawings, the dual mill of the invention has first and second similar compartments 11 and 12 formed therein, these compartments being fully separated from each other by a divider wall 14 which includes a central portion 14a and side portions 14b and 14c. The central portion 14a forms a housing and support structure for drive shaft 17, this shaft being rotatably supported on this wall portion. A skirt 65 is provided around the base of the unit.

Mounted at the bottom of each compartment is a grinder 20 and 21. Grinder elements 20 and 21 may be of the type described in my U.S. Pat. No. 3,168,256. A pair of cross plates 27 and 28 are formed at the top and bottom portions of wall portion 14a. Rotatably supported in plates 27 and 28 are a pair of drive shafts 30 and 31 for rotatably driving grinders 20 and 21 respectively, these shafts being fixedly attached to their associated grinder wheels. Fixedly attached to the top ends of shafts 30 and 31 after these shafts have passed through plate 27 are a pair of similar spur gears 35 and 36 respectively.

Figure 6:
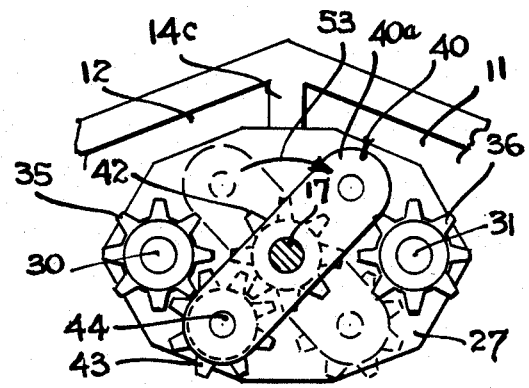
FIG. 6 is a cross sectional view taken along the plane indicated by 6—6 in FIG. 2
Figure 8:
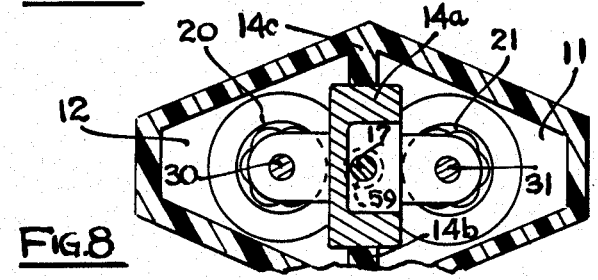
FIG. 8 is a cross sectional view taken along the plane indicated by 8—8 in FIG. 2.
Figure 7:
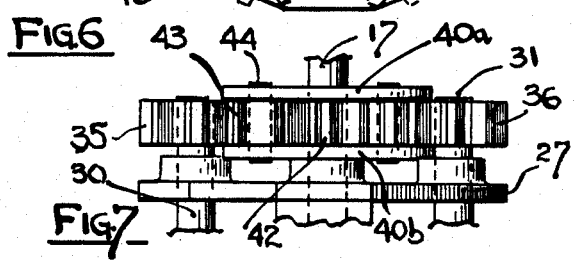
FIG. 7 is a fragmentary view illustrating the gear mechanism of the preferred embodiment.

Pivotally supported on drive shaft 17 is a swivel gear support structure 40 formed from a pair of spaced apart arms 40a and 40b. Supported at the center of the gear support between the arms thereof and fixedly attached to shaft 17 is a spur gear 42. Support structure 40 frictionally abuts against gear 42 and thus tends to move therewith to the right and left when the shaft 17 is rotated. A second spur gear 43 is rotatably mounted between plates 40a and 40b on pivot pin 44. Gear 43 always engages gear 42 and rotates therewith when shaft 17 is rotated. Handle 50 is fixedly attached to shaft 17 by means of a set screw 51. When handle 50 is rotated clockwise, as indicated by arrow 53 in FIG. 6, gear 43 will engage gear 35 and with rotation of shaft 17 will rotatably drive grinder shaft 30 to effect grinding of the condiment in compartment 12. Conversely, when the knob 50 is turned in a counter clockwise direction, gear 43 will engage gear 36 (as shown in phantom in FIG. 6) and effect rotation of shaft 31 to cause grinding of the condiment in compartment 11.

Figure 4:
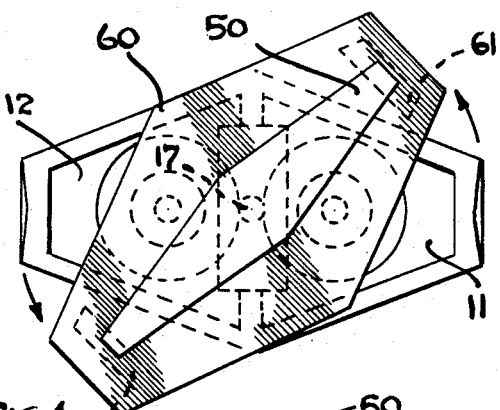
Figure 2:
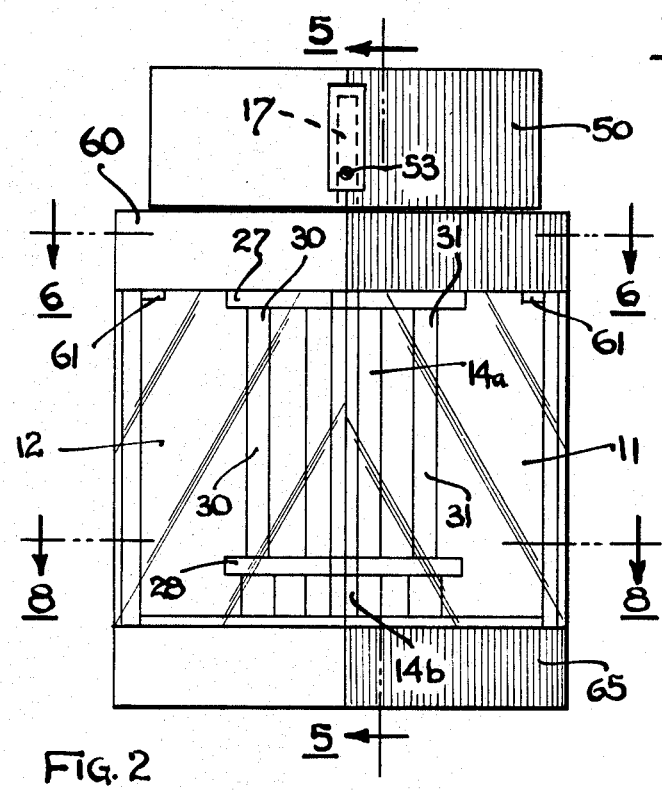
Figure 5:
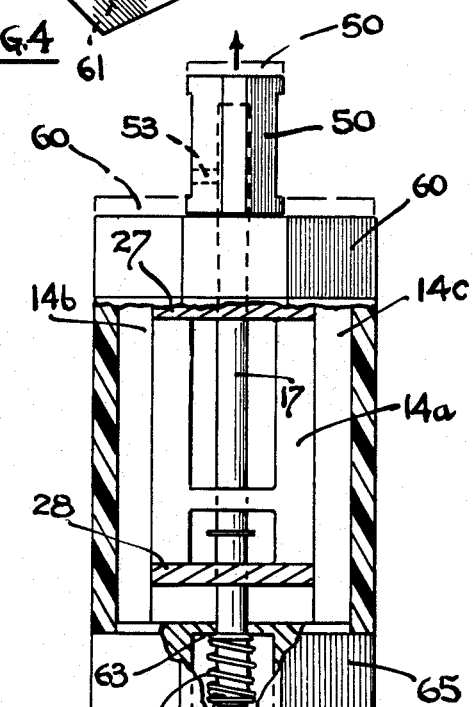
Figure 3:
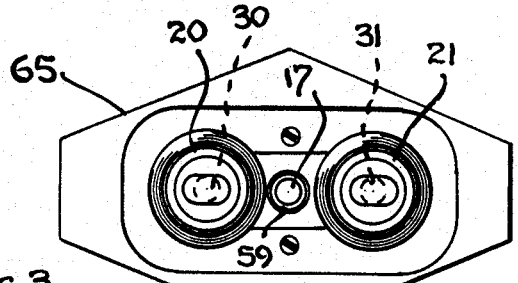

Spring 57 is slidably mounted on shaft 17 between inner surface 63 and cylindrical stop member 59 which is fixedly attached to shaft 17. In its installed position, spring 57 is compressed so that it urges shaft 17 downwardly, such downward motion of the shaft being limited by gear support member 40 which is pivotally supported on the shaft. Cover member 60 is mounted over shaft 17 between handle 50 and the top edges of the compartments which are part of the main body of the mill. Cover 60 thus can be lifted upwardly against the urging of spring 57 and rotated as shown in FIG. 4 to open the tops of compartments 11 and 12 for filling with condiment. The cover can then be rotated back into position to cover the compartments; tabs 61 which extend from the inner surfaces of the cover near the opposite ends thereof operating to retain the cover in position.

While the device has been described and illustrated in detail, it is to be clearly understood that this is intended by way of illustration and example only, it is not to be taken by way of limitation, the spirit and scope of this invention being limited only by the terms of the following claims.

I claim:

1. A dual condiment mill comprising:
   first and second compartments having top and bottom ends and a divider wall therebetween, each of said compartments for containing a separate condiment to be ground, a first and second grinder installed at the bottom of each compartment respectively, first and second shafts having bottom ends fixedly attached to each of said grinders and top ends respectively extending upwardly through their associated compartments, first and second gears fixedly attached to the top ends of each of said first and second shafts respectively, gear drive means pivotally supported on said mill opposite said gears, and means for use in alternatively driving the gear drive means rotatably in a first direction to engage and rotatably drive only the first of said gears, shafts and grinders or in a second direction opposite to said first direction to rotatably drive only the second of said gears, shafts and grinders.

2. The mill of claim 1 wherein the gears comprise spur gears, the means for use in driving the gear drive means comprising a third shaft rotatably supported on the divider wall between said compartments, the gear drive means comprising a pair of spaced apart arms pivotally supported on said third shaft, a third spur gear mounted between said arms and fixedly attached to said third shaft, and a fourth spur gear rotatably mounted between said arms and in constant engagement with the third spur gear, said fourth gear engaging said first gear with rotation of said third shaft in one direction and said second gear with rotation of said third shaft in a direction opposite to said one direction.

3. The mill of claim 2 wherein the means for use in driving the gear drive means further comprises a handle fixedly attached to said third shaft above said spaced apart arms.

4. The mill of claim 1 and further including cover means for covering the tops of said compartments, means for pivotally supporting the cover means on said mill, and means for resiliently urging said cover means against the tops of the compartments.

5. The mill of claim 4 wherein the means for use in driving the gear drive means comprises a third shaft rotatably supported on said mill, said means for pivotally supporting the cover means comprising said third shaft.

6. The mill of claim 5 wherein the means for resiliently urging said cover means comprises coil spring means mounted over the third shaft for urging said shaft away from said cover means, and means for limiting axial movement of the cover along said shaft away from the tops of the compartments such that the cover means can be lifted away from the tops of said compartments and axially rotated against the resilient action of said spring means.

7. The mill of claim 6 wherein said cover means has tab means thereon for retaining the cover means in position on the tops of the compartments.

* * * * *